Feb. 1, 1949.    R. F. HERTEL    2,460,749
DYNAMOELECTRIC MACHINE
Filed Dec. 29, 1945    2 Sheets-Sheet 1

Inventor:
Roland F. Hertel,
by Prowell S. Mack
His Attorney.

Feb. 1, 1949.   R. F. HERTEL   2,460,749
DYNAMOELECTRIC MACHINE
Filed Dec. 29, 1945   2 Sheets—Sheet 2
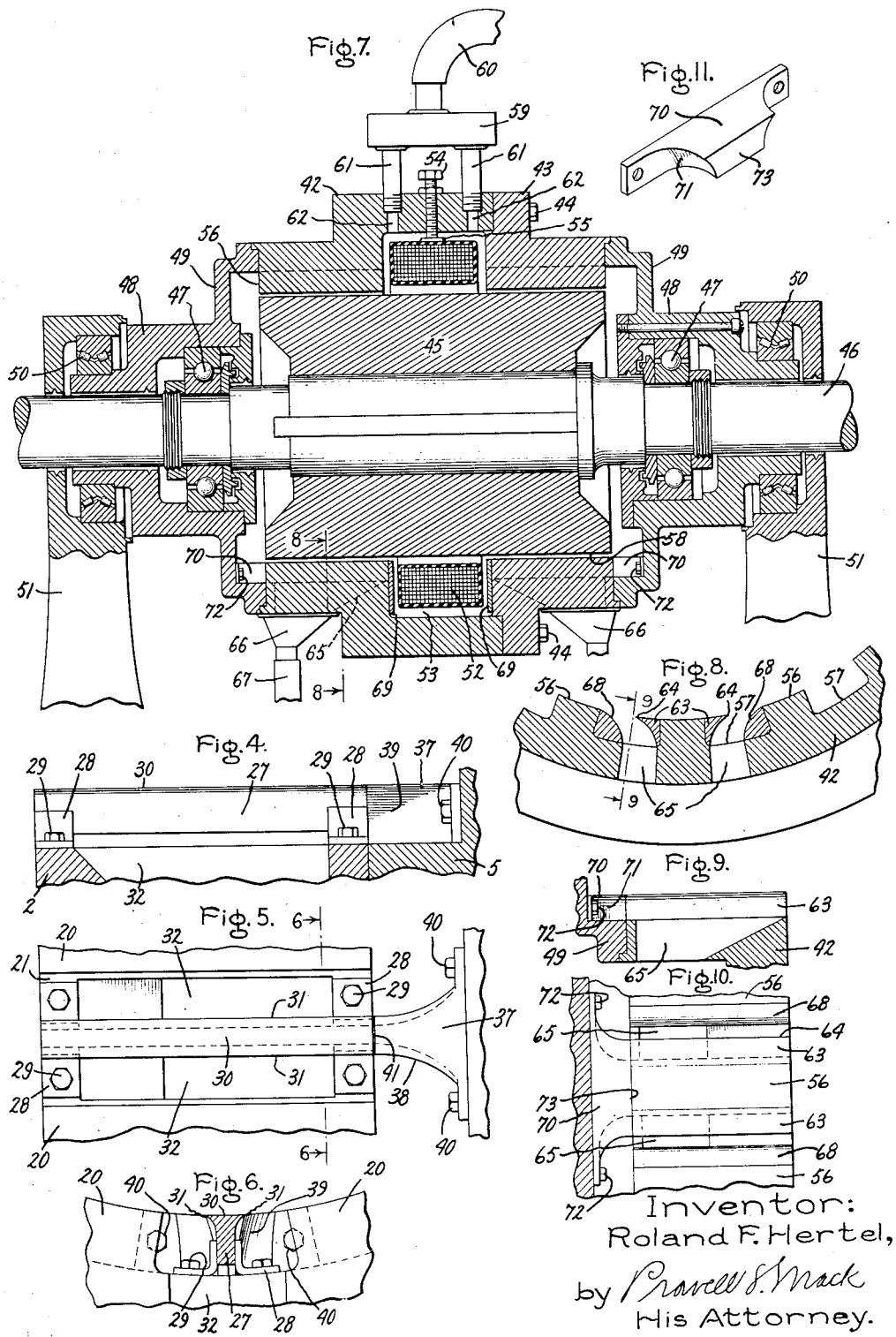
Inventor:
Roland F. Hertel,
by Pravell S. Mack
His Attorney.

Patented Feb. 1, 1949

2,460,749

UNITED STATES PATENT OFFICE 2,460,749.

DYNAMOELECTRIC MACHINE

Roland F. Hertel, Fort Wayne, Ind., assignor to General Electric Company, a corporation of New York Application December 29, 1945, Serial No. 638,374

7 Claims. (Cl. 188—104)

My invention relates to dynamoelectric machines and particularly to inductor eddy current types of machines which are particularly useful as clutches, dynamometers, and brakes.

An object of my invention is to provide an improved dynamoelectric machine of the inductor type.

Another object of my invention is to provide an improved inductor type dynamoelectric machine which is adapted to absorb power and to be cooled by a fluid supplied in direct contact with the eddy current surfaces of the machine.

A further object of my invention is to provide an improved dynamoelectric machine of the inductor eddy current type in which a cooling fluid is supplied into direct contact with the eddy current surfaces of the machine and an arrangement is provided for assisting in the removal of the cooling fluid from the surface of the rotatable member of the machine for minimizing hydraulic drag.

Further objects and advantages of my invention will become apparent and my invention will be better understood from the following description referring to the accompanying drawings, and the features of novelty which characterize my invention will be pointed out with particularity in the claims annexed to and forming part of this specification.

Figure 1:
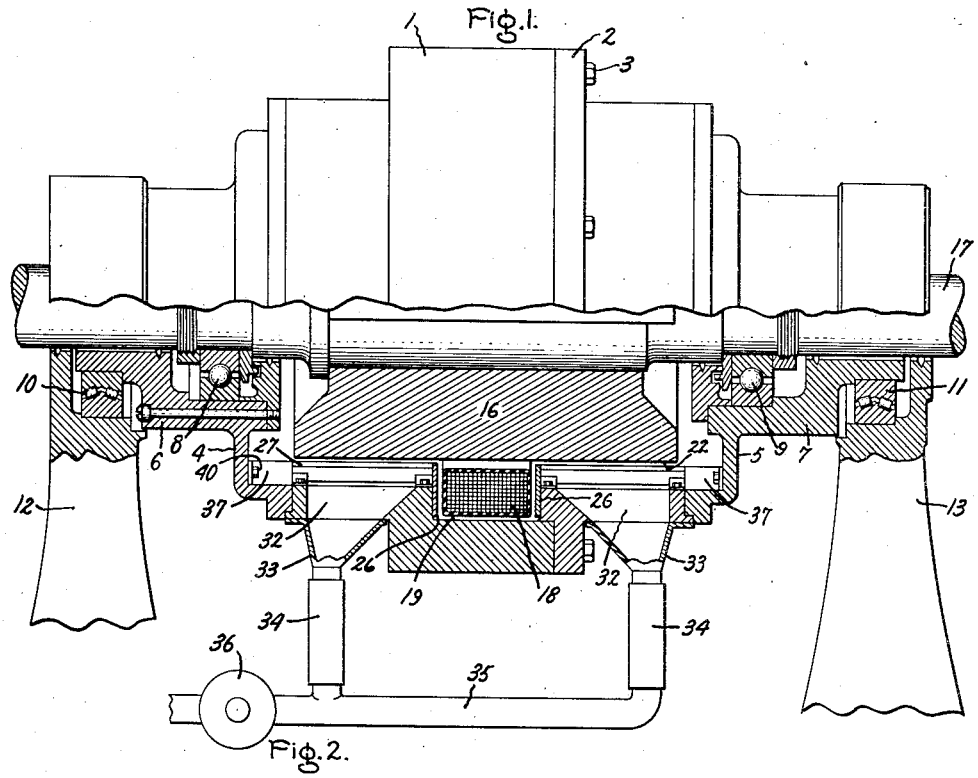
Figures 2, 3:
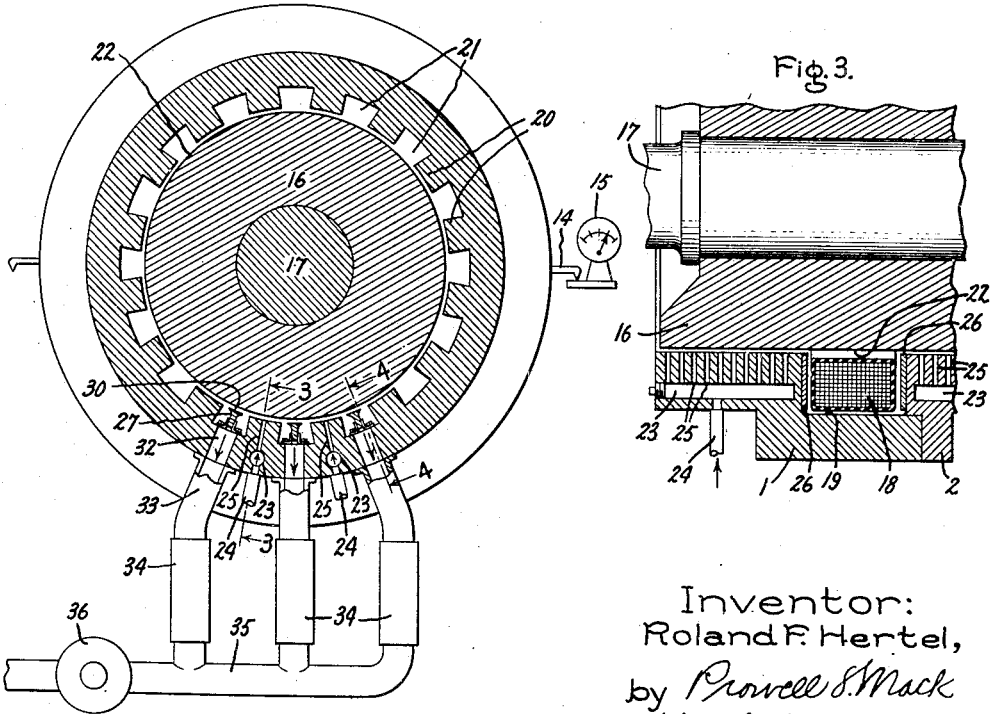

In the drawing, Fig. 1 is a side elevational view, partly in section, of a dynamoelectric machine particularly adapted to be used as a dynamometer which is provided with an embodiment of my improved construction; Fig. 2 is an end elevational view, partly in section, of the construction shown in Fig. 1; Fig. 3 is a partial side elevational view taken along line 3—3 of Fig. 2; Fig. 4 is an enlarged sectional view taken along line 4—4 of Fig. 2; Fig. 5 is a plan view of the part of the machine shown in Fig. 4; Fig. 6 is a sectional view taken along line 6—6 of Fig. 5; Fig. 7 is an elevational view, partly in section of another embodiment of my improved dynamoelectric machine; Fig. 8 is a sectional view taken along line 8—8 of Fig. 7; Fig. 9 is a sectional view taken along line 9—9 of Fig. 8; Fig. 10 is a plan view of the fragmentary view shown in Fig. 9; and Fig. 11 is a perspective view of an embodiment of an end shield water scoop which may be used with my improved construction and which is shown in Figs. 7, 9, and 10.

Referring to the drawing, I have shown in Figs. 1 through 6 one embodiment of my invention applied to a dynamoelectric machine of the inductor eddy current type particularly adapted to be used as a dynamometer provided with relatively rotatable inner and outer inductor members. In this construction, the dynamoelectric machine is provided with a relatively stationary member having a core of magnetic material formed by two core sections 1 and 2 secured together in any suitable manner, as by bolts 3. The core sections 1 and 2 are supported by end shields 4 and 5 having sleeve portions 6 and 7 formed as bearing housings for antifriction ball bearings 8 and 9 arranged to support rotatably a rotatable member of the machine. These sleeves 6 and 7 also are rotatably supported by antifriction thrust roller bearings 10 and 11 mounted in suitable pedestals 12 and 13, respectively, to permit the relatively stationary member to rotate through a limited angle for the purpose of transmitting the torque thereon through a suitable torque arm 14 to a force measuring device 15, as in any conventional dynamometer construction. The rotatable member of the machine includes a core 16 of magnetic material mounted on a shaft 17 which is rotatably supported by the antifriction bearings 8 and 9 mounted in the stationary member sleeves 6 and 7. Magnetic excitation is provided to the machine by a substantially toroidal field exciting winding 18 which is arranged in a suitable winding recess 19 formed in the core of the stationary member between the core members 1 and 2. The stationary member of the machine is formed with a plurality of longitudinally extending teeth 20 in the core members 1 and 2 with slots 21 extending longitudinally between the teeth 20 to provide a periodic variation in the flux linkages of any given portion of the surface of the rotatable member core 16 as it rotates past the ends of the teeth 20 from which it is radially spaced by a suitable air gap. As in any conventional eddy current inductor type machine, this variation in the flux linkages with a portion of the relatively smooth cylindrical peripheral air gap surface 22 of the rotatable member core 16 induces eddy currents in this surface of the rotatable member core which in turn generates heat which represents energy to be dissipated. This energy can readily be removed from the machine by supplying cooling fluid, such as water, into the air gap between the relatively rotatable and stationary cores of the machine into direct contact with these cores. In this construction, I provide a pair of manifold headers 23 to which a cooling fluid is supplied by suitable flexible hose-line connections 24 which minimize the restraining effect on the stationary member which otherwise might be exerted thereon by these connections. The headers 23 are formed by longitudinally extending openings in the core members 1 and 2 on each side of the coil recess 19 and are arranged in the lowermost part of these core members on each side of substantially the lowermost slots 21 adjacent the base of teeth 20 through which a plurality of outwardly extending passages 25 are formed which pass or extend from the header 23 through the teeth to the air gap surfaces thereof for supplying cooling fluid into the air gap and onto the substantially smooth cylindrical surface 22 of the rotatable inner member of the machine. In the illustrated construction, a suitable closure, such as a pipe plug, is threadedly engaged with the outer ends of the openings forming the headers 23, and baffles 26 are arranged over the winding recess end of the teeth and slots in the lowermost part of the machine to prevent or minimize the passage of cooling fluid through the slots 21 into the winding recess 19. With this type construction, the cooling fluid, such as water, is supplied onto the cylinderical surface 22 of the rotatable member and tends to collect thereon to a predetermined depth dependent upon the specific weight of the fluid employed and on the speed of operation of the rotatable member. This depth of cooling fluid on the surface of the rotatable member may be determined by a consideration of Bernoulli's theorem for incompressible fluid, such as water, which states that the sum of the static pressure plus the velocity pressure of an incompressible fluid remains substantially constant. Thus, the cooling fluid which is sprayed on the surface of the rotatable member core tends to cling to this core and to rotate with the core, such that a layer of cooling fluid will be formed around the complete periphery of the rotatable member core 16. In order to utilize the cooling effect of this cooling fluid, it is necessary that the cooling fluid be removed from the surface of the rotatable member core where it is heated and to replace such heated cooling fluid with fluid at a lower temperature. A certain amount of the cooling fluid on the cylindrical surface 22 of the rotatable member core will pass off at both axial ends of the rotatable member core 16 into the space at the ends of the machine formed by the end shields 4 and 5. However, it has been found that for the most efficient utilization of the machine and of the cooling system, it is desirable that this fluid should be removed more rapidly than merely by permitting its flow axially along the surface 22 into the end shield spaces. In order to expedite the removal of the heated fluid from the surface of the core 16, I provide at least one, and preferably a plurality of longitudinally extending scoop members of nonmagnetic material extending outwardly towards the smooth surface 22 of the rotatable member. In this embodiment of my invention, these scoop members are arranged in the three lowermost slots 21 and include longitudinally extending scoops 27 which are mounted in the slots 21 by brackets 28 suitably secured to the scoops 27, as by welding, and secured to the base of the slot 21 by suitable screws or bolts 29. These scoops 27 are formed with curved sides which extend from a relatively narrow base to a wider air gap surface 30 with outer longitudinal edges 31 which extend towards the adjacent teeth and provide scraping edges which scrape or scoop off fluid from the air gap surface of the rotatable member core 16 and direct this removed cooling fluid into the slots 21 from which it is exhausted through drain passages 32 which extend through the core sections 1 and 2 and communicate with drain connections 33 which may either extend loosely into drain line connectors 34 to provide for a limited amount of relative movement between the ends of the members 33 and the inner sides of the members 34 or these members may be made of a flexible hose which will offer substantially no restraining force to the slight rotational or angular movement of the stationary member of the machine. If these drain connections 34 are flexible hose, additional drainage may be obtained by connecting them by a fluid line 35 to the intake side of an exhausting pump 36 for creating a suction in the drains 32 for further insuring the complete withdrawal of cooling fluid from the slots 21 of the machine and to prevent building up of fluid in these slots.

In addition, it has been found that cooling fluid which passes axially off the ends of the rotatable member core 16 into the spaces at both ends of the machine within the end shields 4 and 5 tends to rotate with the rotation of the core 16, such that it does not flow smoothly out of the drain openings 32. In order to facilitate removal of this cooling fluid and increase the efficiency of the cooling system, end shield scoops 37 formed with inwardly curved surfaces 38 also downwardly curved as shown at 39, formed as compound curves on the sides of the scoops 37 direct cooling fluid from the end shield spaces inwardly and downwardly towards the drain openings 32. As shown more clearly in Figs. 4, 5, and 6, these end shield scoops are mounted in the lowermost portion of the end shields and are secured in any suitable manner, as by bolts 40 to the inner surfaces of the end shields. These scoops are preferably the same in number as the slot scoops 27 and also are preferably arranged in the end shields substantially opposite the end of the slot scoops 27 and formed with inner ends 41 which are substantially of the same size and contour as the ends of the slot scoops 27. The end shield scoops do not form a part of this invention and are fully described and claimed in copending application Serial No. 639,987 of Phil S. Potts, filed January 9, 1946, and assigned to the assignee of this application.

In some constructions it might be found desirable to form the slot scoops 27 and the end shield scoops 37 of a single unit, and this feature may be determined by assembly requirements of the machine in order to facilitate the assembly of the end shields and the stationary member core. Thus, with this construction, I have provided an arrangement for supplying cooling fluid directly into the air gap into direct heat-transferring contact with the surfaces in which the heat is generated and provide an arrangement for adequately removing the heated cooling fluid from the surface of the rotatable member of the machine and for preventing the accumulation of cooling fluid within the air gap and within the spaces around the rotatable member in the end shields of the machine, thereby minimizing possible erratic effects of hydraulic drag on the machine. Any suitable means may be provided for regulating the flow of the cooling fluid into the machine as desired either to regulate the amount of fluid which will adhere to the surface 22 of the rotatable member core 16 at the desired operating speed or to regulate the flow of this fluid in accordance with any other characteristic, such as the temperature of the exhaust fluid for the most efficient utilization of the cooling system.

In Figs. 7 to 11, inclusive, I have shown another embodiment of my improved dynamoelectric machine construction in which a machine of the eddy current inductor type is provided with a stationary member having core sections 42 and 43 of magnetic material suitably secured together in any suitable manner, as by bolts 44, and arranged about an inner relatively rotatable member having a core 45 of magnetic material mounted on a rotatable shaft 46 rotatably supported by suitable antifriction ball bearings 47 arranged in bearing housings formed by sleeves 48 on stationary member end shields 49. The stationary member end shields 49 are adapted to support the stationary member core sections 42 and 43 for limited rotational movement, as in the arrangement shown in Fig. 1, by antifriction thrust roller bearings 50 mounted in suitable pedestals 51. A suitable field exciting winding 52 is mounted in a winding recess 53 formed in the stationary member between the core portions 42 and 43 for magnetically exciting the cores of the rotatable and stationary members of the machine. A plurality of circumferentially spaced apart mounting screws 54 extend through the stationary member core into engagement with mounting clips 55 for positioning and centering the exciting winding 52 within the winding recess 53.

The energy absorption of this machine which is shown as a dynamometer or a brake is provided by the same dynamoelectric reaction as that described with respect to the construction shown in Fig. 1 and includes the provision of a plurality of circumferentially spaced longitudinally extending teeth 56 formed in the inner air gap surface of the core of the stationary member with slots 57 formed therebetween to provide for a variation in the flux linkages with a given surface of the rotatable member core 45 as it rotates within the stationary member. Such operation of the machine generates eddy currents in the substantially smooth cylindrical surface 58 of the rotatable member of the machine, and these eddy currents are dissipated in the form of heat in this portion of the machine. In order to remove this heat from the machine, cooling fluid, such as water is applied into the air gap of the machine into direct heat-transfer relationship with the surface 58 of the rotatable member core 45, and in this construction is supplied through a header 59 which connects with a source of cooling fluid supply through a flexible hose connection 60 for minimizing the restraining effect of this connection on the limited rotation of the stationary member of the machine. The cooling fluid passes from the supply header 59 through suitable pipe connections 61 into passages 62 in the core of the stationary member into the winding recess 53 in back of the exciting winding 52 and flows around the field exciting winding 52, thereby cooling said winding, and passes from this winding recess 53 through a communication at the inner end thereof with the air gap between the two relatively rotatable members and into heat-transfer contact with the outer peripheral surface 58 of the rotatable member core 45.

As in the construction illustrated in Figs. 1 to 6, inclusive, in this arrangement it is also desirable to remove excess cooling fluid or overheated cooling fluid from the surface 58 of the rotatable member core 45, and this is facilitated by the provision of longitudinally extending scoop members 63 of nonmagnetic material extending outwardly towards the smooth cylindrical surface 58 of the rotatable member and into the slots 57 adjacent the lowermost part of the machine. These scoop members 63 are formed with curved sides and are narrower at the base section thereof than at the air gap surface, thereby forming outer longitudinal edges 64 which scrape or scoop fluid from the surface 58 of the rotatable member core 45 as it rotates and directs the removed cooling fluid into the slots 57. This cooling fluid is adapted to be drained by suitable drain passages 65 which extend through the stationary member core and communicate with drain connections 66 which are suitably connected to connections 67 from which the cooling fluid may be pumped by suitable exhaust pumps as in the arrangement shown in Fig. 1. In this construction, the cooling fluid is assisted in its flow into the lowermost slots 57 and the drain passages 65 by the provision of longitudinally extending transversely curved substantially smooth guiding surface members 68 of nonmagnetic material arranged in the slots 57 on the trailing side of the teeth adjacent each of the scoop members 63 for guiding cooling fluid from the air gap into the slots 57 and the drain passages 65. The outer surface of these guiding members 68 is transversely curved to provide a curved outer slot surface extending from the air gap end of the tooth into the base of the slot. In this construction, it is desirable that a tooth 56 should be the lowermost portion of the stationary member core and thereby provide at least one scoop and one guiding surface member on each side of the lowermost tooth 56 to provide for the scooping of cooling fluid from the rotatable member surface 58 for either direction of rotation thereof. As in the arrangement shown in Figs. 1 to 6, inclusive, this construction also preferably is provided with baffles 69 which close off the lower slot ends adjacent the field exciting winding recess 53 to assure that the scooped off cooling fluid flows out through the drain passages 65 rather than into the space around the field exciting winding 52. In this construction, the end shields 49 of the machine also are provided with end shield scoops 70 formed with inwardly and downwardly curved surfaces 71 similar to the end shield scoops 38 described with respect to Figs. 1 to 6, inclusive, which provide for the drainage of cooling fluid out of the end shield spaces and into the drains 65, from which it is removed from the machine. These end shield scoops 70 also are preferably secured to the end shields 49 in any suitable manner, as by bolts 72 and formed with inner ends 73 which substantially conform in contours and dimensions to the ends of the slot scoops 63 and the tooth 56 to which these slot scoops are secured. These end shield scoops, however, do not form a part of this invention and are described and claimed in copending application Serial No. 639,987, filed January 9, 1946, Phil S. Potts, and assigned to the assignee of this application.

For certain types of machines, it may be found that the method of introducing fluid as disclosed with this construction and the arrangement of slot scoops and guiding surface members may provide a more simple arrangement than that disclosed in Figs. 1 to 6, inclusive, although the readily removable and replaceable features of the construction shown in Figs. 1 to 6 may be preferred to the integrally secured scoop and guiding surface member arrangement shown in Figs. 7 to 10, inclusive, in which the scoops 63 and the guiding surface member 68 may be secured to the stationary member core in any suitable manner, as by welding thereto. Furthermore, in this construction, as in the former arrangement, the rate of flow of the cooling fluid may be regulated as desired responsive to different characteristics of the machine, such as the amount of cooling fluid which may adhere to the cylindrical surface 58 of the rotatable member core or in accordance with the rate at which the cooling fluid may be removed from the machine or in accordance with the temperature of the exhausted cooling fluid or any other desired characteristic thereof, as is conventionally incorporated in the cooling system of this type of machine.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent on the United States is:

1. A dynamoelectric machine having a relatively stationary member with a core of magnetic material and a relatively rotatable member with a core of magnetic material arranged with an air gap between said cores, means for magnetically exciting said cores, longitudinally extending teeth with slots therebetween in the inner peripheral surface of the magnetic material of said stationary member core, means for supplying cooling fluid into said air gap onto said rotatable member, means including longitudinally extending scoop members of nonmagnetic material in said slots adjacent the lowermost part of said stationary member with an outer longitudinal edge of said scoop members extending towards the adjacent teeth for removal of fluid from said rotatable member and for directing such removed cooling fluid into said slots, means including longitudinally extending guiding surface members of nonmagnetic material having transversely curved outer slot surfaces extending from the air gap surface of said latter teeth into said slot on the side of the tooth adjacent each of said scoop members for guiding cooling fluid from said air gap into said slots, and means for draining removed cooling fluid from said slots.

2. A dynamoelectric machine having a relatively stationary outer member with a core of magnetic material and a relatively rotatable inner member with a core of magnetic material having a relatively smooth substantially cylindrical outer surface arranged with an air gap between said cores, means including a field exciting winding for magnetically exciting said cores, longitudinally extending teeth with slots therebetween in the inner peripheral surface of the magnetic material of said outer member core, means for supplying cooling fluid into said air gap onto said rotatable inner member, means including longitudinally extending scoop members of nonmagnetic material extending outwardly towards said smooth cylindrical rotatable member surface in said slots adjacent the lowermost part of said outer member with an outer longitudinal edge of said scoop members extending towards the adjacent teeth for removal of excess fluid from said rotatable member cylindrical surface and for directing such removed cooling fluid into said slots, means including longitudinally extending guiding surface members of non-magnetic material having transversely curved outer slot surfaces extending from the air gap surface of said latter teeth into said slot on the side of the tooth adjacent each of said scoop members for guiding cooling fluid from said air gap into said slots, and means including drain passages extending into said slots for draining cooling fluid therefrom.

3. A dynamoelectric machine having a relatively stationary outer member with a core of magnetic material and a relatively rotatable inner member with a core of magnetic material arranged with an air gap between said cores, means for magnetically exciting said cores, longitudinally extending teeth with slots therebetween in the inner peripheral surface of the magnetic material of said outer member core, means for supplying cooling fluid into said air gap onto the surface of said rotatable inner member, means including longitudinally extending scoop members of nonmagnetic material secured to the outer edges of at least one of the substantially lowermost teeth with an outer longitudinal edge of said scoop members extending towards the adjacent teeth for removal of excess fluid from said rotatable member cylindrical surface and for directing such removed cooling fluid into said slots, means including longitudinally extending guiding surface members of nonmagnetic material having transversely curved outer slot surfaces extending from the air gap surfaces of said latter teeth into said slot on the side of the tooth adjacent each of said scoop members for guiding cooling fluid from said air gap into said slots, and means for draining cooling fluid from said slots.

4. A dynamoelectric machine having a relatively stationary outer member with a core of magnetic material and a relatively rotatable inner member with a core of magnetic material arranged with an air gap between said cores, means including a field exciting winding for magnetically exciting said cores, longitudinally extending teeth with slots therebetween in the inner peripheral surface of the magnetic material of said outer member core, means for supplying cooling fluid into said air gap onto the surface of said rotatable inner member, means including longitudinally extending scoop members of nonmagnetic material secured to the outer edges of at least one of the substantially lowermost teeth and extending outwardly towards said smooth cylindrical rotatable member surface in said slots adjacent the lowermost part of said outer member with an outer longitudinal edge of said scoop members extending towards the adjacent tooth for removal of excess fluid from said rotatable member cylindrical surface and for directing such removed cooling fluid into said slots, means including longitudinally extending guiding surface members of nonmagnetic material having transversely curved outer slot surfaces extending from the air gap surfaces of said latter teeth into the base of said slot on the side of the tooth adjacent each of said scoop members for guiding cooling fluid from said air gap into said slots, and means including drain passages extending into said slots for draining cooling fluid therefrom.

5. A dynamoelectric machine having a relatively stationary outer member with a core of magnetic material and a relatively rotatable inner member with a core of magnetic material having a relatively smooth substantially cylindrical outer surface arranged with an air gap between said cores, an exciting winding recess in one of said members, means including a field exciting winding in said winding recess for magnetically exciting said cores, longitudinally extending teeth with slots therebetween in the inner peripheral surface of the magnetic material of said outer member core, means for supplying cooling fluid into said air gap onto said smooth cylindrical surface of said rotatable inner member, means including longitudinally extending scoop members of nonmagnetic material secured to the outer edges of the substantially lowermost tooth extending outwardly towards said smooth cylindrical rotatable member surface in said slots adjacent the lowermost part of said outer member with an outer longitudinal edge of said scoop members extending towards the adjacent tooth for removal of excess fluid from said rotatable member cylindrical surface and for directing such removed cooling fluid into said slots, means including longitudinally extending guiding surface members of nonmagnetic material having transversely curved outer slot surfaces extending from the air gap surface of said latter teeth into the base of said slots on the side of the tooth adjacent each of said scoop members for guiding cooling fluid from said air gap into said slots, and means including drain passages extending into said slots for draining cooling fluid therefrom.

6. A dynamoelectric machine having a relatively stationary outer member with a core of magnetic material and a relatively rotatable inner member with a core of magnetic material arranged with an air gap between said cores, means including a field exciting winding for magnetically exciting said cores, means for measuring the torque on said outer member, longitudinally extending teeth with slots therebetween in the inner peripheral surface of the magnetic material of said outer member core, means for introducing cooling fluid into said stationary member adjacent the upper part thereof for passage around said field exciting winding into said air gap and onto the surface of said rotatable inner member, means including longitudinally extending scoop members of nonmagnetic material secured to the outer edges of at least one of the substantially lowermost teeth and extending outwardly towards said smooth cylindrical rotatable member surface into said slots adjacent the lowermost part of said outer member with an outer longitudinal edge of said scoop members extending towards the adjacent tooth for removal of excess fluid from said rotatable member cylindrical surface and for directing such removed cooling fluid into said slots, means including a longitudinally extending guiding surface member of nonmagnetic material having a transversely curved outer slot surface extending from the air gap surface of said tooth into the base of said slot on the side of said tooth adjacent each of said scoop members for guiding cooling fluid from said air gap into said slots, means including drain passages extending into said slots for draining cooling fluid therefrom.

7. A dynamoelectric machine having a relatively stationary outer member with a core of magnetic material and a relatively rotatable inner member with a core of magnetic material having a relatively smooth substantially cylindrical outer surface arranged with an air gap between said cores, an exciting winding recess in said outer member, means including a toroidal field exciting winding in said winding recess mounted on said outer member for magnetically exciting said cores, means for rotatably supporting said rotatable inner member, means for rotatably supporting said outer member, means for measuring the torque on said outer member, teeth with slots therebetween in the inner peripheral surface of the magnetic material of said outer member core on each side of said winding recess, means for introducing cooling fluid into said exciting winding recess for passage around said field exciting winding into said air gap and onto said smooth cylindrical surface of said rotatable inner member, means including longitudinally extending scoop members of nonmagnetic material secured to the outer edges of the substantially lowermost tooth on each side of said winding recess and extending outwardly towards said smooth cylindrical rotatable member surface to said slots adjacent the lowermost part of said outer member with an outer longitudinal edge of said scoop members extending towards the adjacent tooth for removal of excess fluid from said rotatable member cylindrical surface and for directing such removed excess cooling fluid into said slots, means including longitudinally extending transversely curved smooth guiding surface members of nonmagnetic material in the slot on the side of the tooth adjacent each of said scoop members for guiding cooling fluid from said air gap into said slots, means including drain passages extending into said slots for draining cooling fluid therefrom, and means including an exhaust pump for withdrawing cooling fluid from said machine slots.

ROLAND F. HERTEL.

REFERENCES CITED

The following references are of record in the file of this patent:

UNITED STATES PATENTS

| Number | Name | Date |
| --- | --- | --- |
| 2,367,636 | Winter | Jan. 16, 1945 |
| 2,398,638 | Hertel | Apr. 16, 1946 |